United States Patent
Freudenberger et al.

(10) Patent No.: US 12,501,534 B2
(45) Date of Patent: Dec. 16, 2025

(54) CHANGING THE ORIENTATION OF THE X-RAY EMITTER IN ORDER TO VARY THE X-RAY RADIATION

(71) Applicant: Siemens Healthineers AG, Forchheim (DE)

(72) Inventors: Joerg Freudenberger, Kalchreuth (DE); Philipp Bernhardt, Forchheim (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/978,709

(22) Filed: Dec. 12, 2024

(65) Prior Publication Data
US 2025/0203744 A1    Jun. 19, 2025

(30) Foreign Application Priority Data
Dec. 15, 2023    (DE) ...................... 10 2023 212 785.7

(51) Int. Cl.
*H05G 1/58* (2006.01)
*A61B 6/00* (2006.01)
(Continued)

(52) U.S. Cl.
CPC ............ *H05G 1/58* (2013.01); *A61B 6/4064* (2013.01); *A61B 6/4233* (2013.01);
(Continued)

(58) Field of Classification Search
CPC ...... H05G 1/58; A61B 6/4064; A61B 6/4233; A61B 6/4441; A61B 6/4452; A61B 6/467; A61B 6/487; A61B 6/545
See application file for complete search history.

(56) References Cited

U.S. PATENT DOCUMENTS

| 5,822,395 | A | 10/1998 | Schardt et al. |
| 7,187,753 | B2 * | 3/2007 | Freudenberger ......... G21K 1/06 378/115 |

(Continued)

FOREIGN PATENT DOCUMENTS

| CN | 103767717 A | 5/2014 |
| CN | 106170249 A | 11/2016 |

(Continued)

OTHER PUBLICATIONS

English translation of DE 102006008255 A1, from the IDS filed Dec. 12, 2024. (Year: 2007).*

(Continued)

*Primary Examiner* — Thomas R Artman
(74) *Attorney, Agent, or Firm* — Harness, Dickey & Pierce, P.L.C.

(57) ABSTRACT

One or more example embodiments relates to a method for generating X-ray radiation having an X-ray characteristic, the method comprising providing a first type of examination information and a second type of examination information for selection; receiving the selected type of examination information in a controller; selecting an X-ray emitter configuration from a plurality of X-ray emitter configurations as a function of the received type of examination information via the controller; determining a control signal as a function of the selected X-ray emitter configuration; automatically adjusting a mechanical adjuster of the X-ray emitter according to the determined control signal to change an orientation of the X-ray emitter in relation to the recording area; and generating X-ray radiation with the X-ray characteristic via the X-ray emitter set for fluoroscopy of the examination object in the recording area.

18 Claims, 3 Drawing Sheets

(51) Int. Cl.
 *A61B 6/40* (2024.01)
 *A61B 6/42* (2024.01)
 *A61B 6/46* (2024.01)
(52) U.S. Cl.
 CPC .......... *A61B 6/4441* (2013.01); *A61B 6/4452* (2013.01); *A61B 6/467* (2013.01); *A61B 6/487* (2013.01); *A61B 6/545* (2013.01)

(56) References Cited

U.S. PATENT DOCUMENTS

| | | | |
|---|---|---|---|
| 7,188,853 B2 | 3/2007 | Yen | |
| 7,286,645 B2 * | 10/2007 | Freudenberger | G21K 1/04 378/146 |
| 7,315,610 B2 * | 1/2008 | Freudenberger | A61B 6/502 378/146 |
| 7,660,390 B2 * | 2/2010 | Bernhardt | A61B 6/504 378/116 |
| 7,889,841 B2 * | 2/2011 | Kargar | A61B 6/5241 378/197 |
| 8,693,636 B2 * | 4/2014 | Feuerlein | A61B 6/50 378/112 |
| 11,096,759 B2 * | 8/2021 | Spahn | A61B 6/032 |
| 11,406,332 B2 * | 8/2022 | Smith | A61B 6/5235 |
| 2004/0218718 A1 | 11/2004 | Feuerlein et al. | |
| 2005/0286681 A1 * | 12/2005 | Bernhardt | A61B 6/504 378/62 |
| 2006/0034426 A1 | 2/2006 | Feuerlein et al. | |
| 2007/0183585 A1 * | 8/2007 | Freudenberger | A61B 6/4021 378/146 |
| 2009/0238325 A1 * | 9/2009 | Kargar | A61B 6/488 378/8 |
| 2009/0238331 A1 * | 9/2009 | Kargar | A61B 6/06 378/19 |
| 2012/0140894 A1 | 6/2012 | Feuerlein et al. | |
| 2014/0112441 A1 | 4/2014 | Becker et al. | |
| 2016/0374639 A1 | 12/2016 | Becker et al. | |
| 2019/0000410 A1 * | 1/2019 | Tanaka | A61B 6/032 |
| 2019/0290221 A1 * | 9/2019 | Smith | A61B 6/466 |
| 2019/0380806 A1 * | 12/2019 | Spahn | G06T 7/32 |

FOREIGN PATENT DOCUMENTS

| | | |
|---|---|---|
| DE | 102006008255 A1 | 8/2007 |
| DE | 10304852 B4 | 10/2007 |
| DE | 102010043712 B4 | 3/2021 |
| EP | 1623672 A1 | 2/2006 |

OTHER PUBLICATIONS

Bernhardt ; Lendl / Verfahren zur Verbesserung der Bildqualität in der röntgenbasierten Bildgebung / Sep 25, 2007.
German Office Action and English translation thereof for German Application No. 10 2023 212 785.7 mailed Aug. 7, 2024.
German Decision to Grant and English translation thereof for German Application No. 10 2023 212 785.7 mailed Feb. 13, 2025.

* cited by examiner

CHANGING THE ORIENTATION OF THE X-RAY EMITTER IN ORDER TO VARY THE X-RAY RADIATION

CROSS-REFERENCE TO RELATED APPLICATION(S)

The present application claims priority under 35 U.S.C. § 119 to German Patent Application No. 10 2023 212 785.7, filed Dec. 15, 2023, the entire contents of which is incorporated herein by reference.

FIELD

One or more example embodiments relates to a method for generating X-ray radiation having an X-ray characteristic, an associated computer program product, an X-ray emitter assembly and a C-arm X-ray system.

RELATED ART

Conventional C-arm X-ray systems are typically specialized for different applications. These applications regularly require significantly different X-ray characteristics, which cannot be generated via one and the same C-arm X-ray system. Therefore, different C-arm X-ray systems are usually used depending on the application. The differences between these C-arm X-ray systems regularly affect the anode plate angle of the anodes of the X-ray emitters.

Applications which typically have significantly different X-ray characteristics are in particular interventional radiography and angiography. With angiography, blood vessels, in particular the heart, are typically shown highlighted via a contrast agent. Interventional radiography combines in particular diagnostic imaging with simultaneous, typically minimally invasive therapeutic interventions. The X-ray characteristics of these two applications differ in particular in a maximum X-ray dose and/or a maximum X-ray cross-section. The X-ray characteristic of neuroradiology is comparable to interventional radiography.

In order to improve the image resolution, EP 1 623 672 A1 publishes that with an X-ray device with an X-ray tube for generating an X-ray beam emanating from a focal spot of a rotating anode that can be rotated about an axis of rotation and with a slit-shaped aperture for generating a fan-shaped beam bundle that can be faded in from the X-ray beam, and moved over an examination area in the manner of a scanner, that the fan-shaped beam bundle can be moved over the examination area substantially in the direction of the axis of rotation of the rotating anode and that the X-ray tube can be tilted about the focal spot in such a way that the fan-shaped X-ray beam bundle is in the area of the highest image resolution or highest image sharpness when moving over the examination area.

It is known from DE 10 2006 008 255 A1 that with an X-ray device a gantry of an X-ray emitter with an anode which can be rotated about an anode axis is attached to a rotor that can be rotated about a Z-axis, wherein the anode axis can be adjusted relative to the Z-axis via a tilting facility and wherein, in order to compensate for an undesirable change in the position of the focal spot in the Z-direction, a movement facility is provided to move the anode in a direction parallel to the Z-axis.

DE 196 39 918 A1 describes an X-ray device with an X-ray tube with vari-focus, with an evacuated housing in which an electron-emitting cathode fixedly connected thereto and an anode plate on which the electron beam accelerated via an electric field are arranged, and an electromagnetic system for deflecting and focusing the electron beam with several current-carrying coil elements, as well as with a lateral X-ray exit window in the housing for the X-ray radiation emitted substantially at right angles to the longitudinal central axis and recorded by an image receiver behind an object couch, wherein at least the anode plate can be tilted with respect to the connecting axis to the image receiver and wherein the electromagnetic system that at least partially surrounds a cathode-side neck section of the housing generates a quadrupole field to change the electron beam cross-section according to the tilt angle.

SUMMARY

One or more example embodiments specifies a method for generating X-ray radiation having an X-ray characteristic, an associated computer program product, an X-ray emitter assembly and a C-arm X-ray system with an extended application area.

Independent of the grammatical term usage, individuals with male, female or other gender identities are included within the term.

BRIEF DESCRIPTION OF THE DRAWINGS

Example embodiments will now be described and explained in greater detail making reference to the exemplary embodiments illustrated in the drawings. In principle, structures and units which remain substantially the same are identified in the following description of the figures with the same reference signs as on the first occurrence of the relevant structure or unit.

In the drawings.

DETAILED DESCRIPTION

Figure 1:
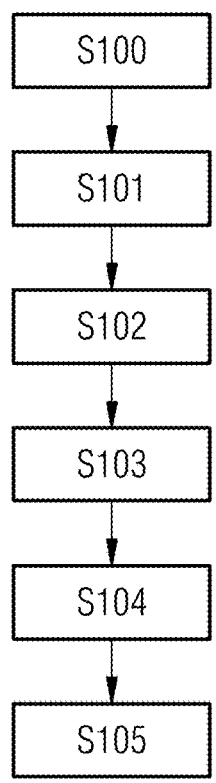
FIG. 1 shows a method according to one or more example embodiments.

A method according to one or example embodiments for generating X-ray radiation having an X-ray characteristic via an X-ray emitter for the fluoroscopy of an examination object in a recording area comprises the following steps:

Provision of a first type of examination information and a second type of examination information for selection via an input means, Receiving the selected type of examination information in a control unit, Selecting an X-ray emitter configuration from a plurality of X-ray emitter configurations as a function of the received type of examination information via the control unit, Determining a control signal as a function of the selected X-ray emitter configuration, Automatic setting of a mechanical adjustment unit of the X-ray emitter according to the determined control signal to change the orientation of the X-ray emitter in relation to the recording area, Generating X-ray radiation with the X-ray characteristic via the X-ray emitter set for fluoroscopy of the examination object in the recording area.

The inventive X-ray emitter assembly for generating X-ray radiation having an X-ray characteristic has
a control unit,
a storage unit, and
an X-ray emitter,
wherein the X-ray emitter has an interface, a mechanical adjustment unit, an evacuated X-ray tube, a cathode, an anode and a collimator,
wherein in the evacuated X-ray tube the anode is arranged in a rotatable manner about an anode axis and the cathode is arranged above the anode decentrally to the anode axis and
wherein the control unit can be connected to the interface for transmitting the control signal.

The inventive C-arm X-ray system has
the inventive X-ray emitter assembly,
an X-ray detector,
a holding apparatus and
a C-arm,
wherein the C-arm surrounds the recording area,
wherein the X-ray emitter is arranged at a first end of the C-arm,
wherein the X-ray detector is arranged at the second end of the C-arm opposite the X-ray emitter,
wherein the C-arm is arranged on the holding apparatus and can be pivoted about the recording area,
wherein the tilt axis of the mechanical adjustment unit is perpendicular on the C-arm plane and/or the linear axis of the mechanical adjustment unit runs parallel to the C-arm plane.

One advantage of one or more example embodiments is that the automatic setting of the mechanical adjustment unit according to the transmitted control signal enables different X-ray characteristics via the same X-ray emitter of the X-ray emitter assembly. Therefore, several applications requiring different X-ray characteristics can advantageously be carried out via the same X-ray emitter assembly, in particular via the same C-arm X-ray system. The several applications typically comprise the fluoroscopy of the examination object in the recording area.

The examination object can be in particular a patient. Alternatively, it is conceivable that the examination object is an object and/or a device. The applications for which the X-ray radiation is generated are in particular medical applications, preferably diagnostic and/or therapeutic applications. The X-rays of the applications typically have a maximum energy below 200 keV, in particular between 20 and 150 keV.

In particular, the X-ray characteristic defines measurable parameters of the X-ray radiation generated. The X-ray characteristic defines in particular a maximum X-ray dose and/or a maximum X-ray cross-section. The X-ray characteristics, in particular the maximum X-ray dose and the maximum X-ray cross-section, depend in particular on the orientation of the X-ray emitter relative to the recording area.

In particular, the maximum X-ray dose defines a maximum number of X-ray quanta with a maximum photon energy per unit area in the recording area. The maximum X-ray dose depends in particular on a tube current. In particular, the tube current specifies an amount of electrons that can be generated at a cathode of the X-ray emitter via an electron emitter. The electron emitter can be a thermionic or cold emitter, for example. With a thermionic electron emitter, the maximum tube current is limited in particular by the heat generated by the emitter. With a cold emitter, the emitter needles with diameters in the nanometer range in particular limit the maximum tube current, as the generated electrons flow through the emitter needles and overheating of the emitter needles due to the electron current must be prevented.

The maximum X-ray dose also depends in particular on a cooling capacity of the X-ray emitter, especially for cooling the anode. The electrons emitted at the cathode typically impinge on the anode in a focal spot, wherein the X-rays are generated upon interaction between the same and the anode material. Typically, only 1% of the electron energy arriving at the anode can be converted into X-ray quanta and the rest into heat. Damage to or destruction of the anode is counteracted in particular by the cooling capacity of the X-ray emitter.

The anode can be a standing anode or a rotating anode. Alternatively, it is conceivable that the anode and the evacuated X-ray tube are mounted so that they can rotate about the axis of rotation.

The maximum photon energy depends in particular on an accelerating voltage between the cathode and the anode. The accelerating voltage is made up in particular of the electrical potential of the cathode and the electrical potential of the anode. The cathode and/or the anode can be at high voltage potential. If the cathode or the anode is at earth potential, the X-ray emitter is a unipolar X-ray emitter, in particular. If the cathode and the anode are at high voltage potential, the X-ray emitter is in particular a bipolar X-ray emitter.

In particular, the maximum X-ray cross-section indicates the area over which the generated X-ray quanta are distributed. The maximum X-ray cross-section can be defined in such a way that only unit areas with a certain number of X-ray quanta are part of the X-ray cross-section. In other words, in particular scattered rays and/or edge regions of the X-ray radiation are regularly not part of the maximum X-ray cross-section. The maximum X-ray cross-section depends in particular on the distance to the focal spot. The maximum X-ray cross-section is therefore typically set by setting the focal spot size. The focal spot size depends in particular on a distance between the cathode and the anode, an emitter surface of the emitter for emitting the electrons, the selection of one or more electron emitters and/or a deflection unit for focusing or defocusing the emitted electrons. The heat input of the emitted electrons in the focal spot of the anode is typically lower the larger the maximum X-ray cross-section is.

The X-ray characteristic depends in particular on the X-ray emitter configuration. The X-ray emitter configuration defines in particular the operating parameters of the X-ray emitter, according to which the X-rays can be generated via the X-ray emitter. The operating parameters of the X-ray emitter can be divided in particular into electrical operating parameters and mechanical operating parameters. The electrical operating parameters are in particular those that set the tube current and/or the focal spot size and/or the focusing or defocusing via the deflection unit. In particular, the mechanical operating parameters set the orientation of the X-ray emitter, especially the anode, relative to the recording area. The orientation can relate in particular to a tilt angle and/or a displacement of the X-ray emitter relative to the recording area.

The provision of the first type of examination information and the second type of examination information may comprise displaying the first type of examination information and the second type of examination information on a display unit to a user of the X-ray emitter. The display unit may have a graphical user interface for selecting the first type of examination information and the second type of examination information.

In particular, the user can be a physician and/or a medical-technical radiology assistant. For example, the user can use the input means to select the first type of examination information provided or the second type of examination information provided.

When selecting using the input means, either the first type of examination information or the second type of examination information is in particular selected exclusively. The selection comprises, in particular, defining the first type of examination information or the second type of examination information as the selected type of examination information.

The input means may comprise the display unit and/or a keyboard and/or a mouse and/or a gesture input unit and/or a voice input unit. In particular, the input means can be connected wirelessly or by cable to the control unit for transmitting the selected type of examination information. The selected type of examination information can be transmitted as a type of examination information signal.

The control unit can comprise an interface for receiving the selected type of examination information and/or the type of examination information signal. The control unit can comprise a memory unit and/or be connected to an external memory unit in which the control unit can store the selected type of examination information and/or the type of examination information signal.

Each X-ray emitter configuration may be available in an X-ray emitter configuration file. The X-ray emitter configuration and/or the X-ray emitter configuration file can be stored in the memory unit. The memory unit can be the memory unit of the control unit or the external memory unit.

Selecting the X-ray emitter configuration may comprise retrieving the plurality of X-ray emitter configurations or X-ray emitter configuration files from the memory unit. In particular, the plurality of X-ray emitter configurations comprises a first X-ray emitter configuration associated with the first type of examination information and a second X-ray emitter configuration associated with the second type of examination information. The first X-ray emitter configuration and the second X-ray emitter configuration differ in particular in terms of their X-ray characteristics and/or the orientation of the X-ray emitter in relation to the recording area. Retrieving the plurality of X-ray emitter configurations from the memory unit may involve querying a database.

Selecting the X-ray emitter configuration may comprise identifying the X-ray emitter configuration associated with the first type of examination information or the second type of examination information. Typically, each type of examination information is assigned an X-ray emitter configuration. In particular, the assignment is a 1-to-1 assignment. The X-ray configuration can be identified in the control unit and/or in the memory unit. For example, the memory unit can comprise a database for identifying the X-ray emitter configuration.

Selecting the X-ray emitter configuration via the control unit means in particular that the control unit is set up to translate the selected type of examination information and/or the associated type of examination information signal into an X-ray emitter configuration, for example by retrieving the X-ray emitter configuration which is assigned to the selected type of examination information. In principle, it is conceivable that the control unit is set up to calculate the selected X-ray emitter configuration via program code means, wherein the selected type of examination information contains input parameters of the program code means.

In particular, the X-ray emitter configuration can be at least partially changeable via an input means. In particular, the electrical operating parameters can be at least partially changeable. In particular, the mechanical operating parameters can be at least partially unchangeable, i.e. fixed. The fixed operating parameters, in particular the fixed mechanical operating parameters, cannot be changed, especially during the generation of X-ray radiation.

After selecting the X-ray emitter configuration, the control signal is determined in particular as a function of the selected X-ray emitter configuration. The control signal can be determined via the control unit and/or an X-ray emitter control unit. For example, the X-ray emitter can comprise the X-ray emitter control unit. The control unit can be embodied to transmit the determined control signal from the control unit to the X-ray emitter and/or the X-ray emitter control unit.

The determination of the control signal can correspond to the selection of the X-ray emitter configuration. In this case, for example, the selected X-ray emitter configuration and/or the X-ray emitter configuration file contains the control signal.

The determination of the control signal may comprise a comparison of the X-ray emitter configuration and/or the control signal of the X-ray emitter configuration and/or the determined control signal with an actual state of the X-ray emitter. For example, the X-ray emitter can transmit the actual state of the X-ray emitter to the control unit before or during the determination of the control signal. Alternatively or additionally, the control unit can preferably retrieve the actual state from the memory unit. If the actual state corresponds in particular to the mechanical operating parameters, the control signal can consist of a confirmation of the actual state.

Alternatively, in particular with a deviation from the actual state, the determination of the control signal can comprise a calculation of at least one adjustment step that maps the in particular mechanical operating parameters. Preferably, the actual state after the adjustment step results in particular in the X-ray emitter configuration, in particular the mechanical operating parameters. The control signal is in particular a delta or differential control signal, which describes a change by the delta or the difference with respect to the mechanical operating parameter.

After determination, the determined control signal can be transmitted, in particular from the control unit or from the X-ray emitter control unit, to the mechanical adjustment unit of the X-ray emitter. In particular, the X-ray emitter and/or the mechanical adjustment unit have an interface for receiving the control signal.

The automatic adjustment of the mechanical adjustment unit comprises in particular a mechanical adjustment of the X-ray emitter relative to the recording area. In particular, the orientation changes a relative position of the X-ray emitter relative to the recording area during automatic adjustment. In particular, the mechanical adjustment unit has a drive in order to be able to automatically adjust the X-ray emitter according to the control signal.

It is conceivable that the automatic adjustment is enabled by the user. For example, the user can enable the automatic adjustment via the input means. In particular, the enabling corresponds to a starting and/or monitoring of the automatic adjustment.

During automatic adjustment, the X-ray emitter in particular is adjusted in at least one spatial direction and/or about a spatial axis relative to the recording area. In particular, the automatic adjustment can comprise a movement along at least one spatial direction and/or a tilting about a spatial axis. The mechanical adjustment unit is set up in particular for movement along at least one spatial direction and/or tilting about a spatial axis of the X-ray emitter.

During automatic adjustment, the evacuated X-ray tube in particular is adjusted relative to the recording area in accordance with the control signal via the mechanical adjustment unit. It may be, for example, that part of the mechanical adjustment unit has the same relative position in relation to the recording area after automatic adjustment as before automatic adjustment. This part of the mechanical adjustment unit may be a bearing that supports the X-ray emitter relative to the recording area. During automatic adjustment, the evacuated X-ray tube in particular is adjusted relative to the bearing.

After automatic adjustment, the X-ray radiation in particular is generated. Advantageously, the X-ray radiation has the X-ray characteristic that is assigned to the selected X-ray emitter configuration and thus to the selected type of examination information. During the generation of the X-ray radiation, at least one attenuation profile is typically captured via an X-ray detector, wherein the recording area is arranged between the X-ray detector and the X-ray emitter. The at least one attenuation profile is preferably characteristic of the selected type of examination information.

In principle, it is conceivable that the X-ray emitter is moved around and/or along the examination object when the X-ray radiation is generated. In this case, the change does not take place during the generation of the X-ray radiation, in particular not via the mechanical adjustment unit. In other words, the mechanical adjustment unit is used in particular to automatically adjust the X-ray emitter before the X-ray radiation is generated. Typically, the fixed mechanical operating parameters do not change during the generation of the X-ray radiation.

The first type of examination information can describe interventional radiography in particular. The second type of examination information can describe angiography in particular. Describing means, in particular, specifying the protocol so that the user can discriminate these different applications and carry them out using the X-ray emitter. The X-ray characteristic of the first X-ray emitter configuration may differ from the X-ray characteristic of the second X-ray emitter configuration in a maximum X-ray dose and/or in a maximum X-ray cross-section.

Advantageously, by way of example, a comparatively high maximum X-ray dose can be achieved via the X-ray emitter, in particular for angiography. For interventional radiography, a comparatively high maximum X-ray cross-section can advantageously be achieved via the same X-ray emitter. In particular, the maximum X-ray dose for angiography is higher than the maximum X-ray dose for interventional radiography. The maximum X-ray cross-section is typically larger for interventional radiography than the maximum X-ray cross-section for angiography. The maximum X-ray dose or the maximum X-ray cross-section is varied in particular by adjusting an angle of the anode surface, on which the focal spot is generated, relative to the recording area.

One embodiment provides that the control signal has a tilt angle signal as a function of the selected X-ray emitter configuration, wherein the mechanical adjustment unit has a tilting facility for tilting the X-ray emitter with respect to the recording area, and wherein the automatic adjustment comprises tilting the X-ray emitter according to the tilt angle signal. The tilting facility is designed in particular to tilt the X-ray emitter about a tilt axis in relation to the recording area. Advantageously, the tilt axis is perpendicular to the anode axis and/or essentially intersects the anode in its focal spot. The anode axis is in particular a longitudinal axis of the evacuated X-ray tube and/or the axis of rotation of the anode.

In this embodiment, the tilting of the X-ray emitter is an adjustment step of the control signal. The tilting of the X-ray emitter in relation to the recording area can correspond to a tilting of the evacuated X-ray tubes relative to the bearing of the X-ray emitter. In particular, the tilt angle signal describes tilting by an angle of between −10° and 10°. This embodiment describes in particular the automatic adjustment about a spatial axis.

One embodiment provides that the control signal has a movement length signal, wherein the mechanical adjustment unit has a movement facility for moving the X-ray emitter along a linear axis, wherein the linear axis extends parallel to the recording area and wherein the automatic adjustment comprises moving the X-ray emitter according to the movement length signal. In this embodiment, the movement of the X-ray emitter is an adjustment step of the control signal. The movement of the X-ray emitter corresponds in particular to a movement of the evacuated X-ray tube relative to the bearing of the X-ray emitter. The movement length signal describes in particular a movement by a length between −10 mm and 10 mm. This embodiment describes in particular the automatic adjustment in one spatial direction.

One embodiment provides that position information of an anti-scatter grid is retrieved, wherein the movement length signal is determined as a function of the position information and wherein the automatic adjustment comprises changing the relative position between the X-ray emitter and the anti-scatter grid. In particular, the position information of the anti-scatter grid can be part of the actual state of the X-ray emitter.

In particular, the position information can be retrieved from the memory unit and/or from the X-ray emitter before or during the determination of the control signal. Alternatively, the position information can be part of the X-ray emitter configuration. The position information can depend in particular on the focal spot on the anode of the X-ray emitter. The position information can be retrieved via the control unit and/or the X-ray emitter control unit. The anti-scatter grid advantageously has a comparatively very high aspect ratio and/or is a so-called "super grid". In this embodiment, it is particularly advantageous that the focus of the anti-scatter grid can be aligned with the focal spot of the anode of the X-ray emitter. This focus can be lost, namely conventionally particularly when the X-ray emitter is rotated or moved relative to the recording area. This embodiment thus advantageously enables the use of an anti-scatter grid with a comparatively very high aspect ratio.

One embodiment provides that the control signal has an emitter selection signal depending on the selected X-ray emitter configuration, wherein a cathode of the X-ray emitter has a first electron emitter and a second electron emitter, wherein the first electron emitter is assigned to the first X-ray emitter configuration for the electron emission and the second electron emitter is assigned to the second X-ray emitter configuration for the electron emission, and wherein the generation of the X-ray radiation comprises electron emission via the first electron emitter or the second electron emitter in accordance with the emitter selection signal. This embodiment is particularly advantageous because the determination of the control signal depends on the emitter selection signal and thus on the associated electron emitter.

One embodiment provides that the control signal has a focal spot length signal as a function of the selected X-ray emitter configuration, wherein the X-ray emitter has a deflection unit for adjusting a length of the electron beam cross-section, and wherein the generation of the X-ray radiation comprises a deflection of the emitted electrons via the deflection unit according to the focal spot length signal. The deflection unit for adjusting the length of the electron beam cross-section is in particular the deflection unit for focusing or defocusing the electrons. Adjusting the length of the electron beam cross-section means, in particular, adjusting an expansion of the electron beam cross-section. By adjusting the length of the electron beam cross-section, a length of the focal spot and/or the X-ray beam cross-section is adjusted in particular.

One embodiment provides that the control signal has a collimator cross-section signal as a function of the selected X-ray emitter configuration, wherein the automatic adjustment comprises adjusting the collimator cross-section of the collimator of the X-ray emitter according to the collimator cross-section signal. The collimator is set up in particular to limit the X-ray cross-section. The X-ray cross-section is limited in particular after the X-ray cross-section has been set as the X-ray characteristic when the X-ray radiation is generated. The collimator therefore acts independently and/or downstream in order to generate X-ray radiation.

The computer program product can be a computer program or comprise a computer program. The computer program product has in particular the program code means that model the method steps according to one or more example embodiments. It is thereby possible to define and repeatedly perform the method according to one or more example embodiments, and to exercise control over relaying the method according to one or more example embodiments. The computer program product is preferably configured in such a manner that the computing unit can carry out the method steps according to one or more example embodiments via the computer program product. The program code means can be loaded in particular into a memory of the computing unit, and can typically be executed via a processor of the computing unit with access to the memory. If the computer program product, in particular the program code means, is executed in the computing unit, all the embodiments according to one or more example embodiments of the method described can typically be performed. The computer program product is, for example, saved on a physical, computer-readable medium and/or stored digitally as a data packet in a computer network. The computer program product may represent the physical, computer-readable medium and/or the data packet in the computer network. One or more example embodiments can thus also be based on the physical, computer-readable medium and/or the data packet in the computer network. The physical, computer-readable medium can usually be connected directly to the computing unit, for example in that the physical, computer-readable medium is inserted into a DVD drive or into a USB port, whereby the computing unit can access the physical, computer-readable medium, in particular with read access. The data packet can preferably be retrieved from the computer network. The computer network may have the computing unit or be connected to the computing unit indirectly via a wide area network (WAN) connection and/or a (wireless) local area network (WLAN or LAN) connection. For example, the computer program product may be stored digitally on a cloud server at a storage location of the computer network, and be transferred via the WAN via the Internet and/or via the WLAN or LAN to the computing unit, in particular by retrieving a download link that points to the storage location of the computer program product.

Features, advantages or alternative embodiments mentioned in the description of the apparatus are also transferable similarly to the method and vice versa. In other words, claims for the method can be developed with features of the apparatus and vice versa. In particular, the apparatus according to one or more example embodiments can be used in the method.

FIG. 1 shows a method for generating X-ray radiation having an X-ray characteristic via an X-ray emitter for fluoroscopy of an examination object in a recording area in a flow chart with the method steps S100 to S105.

Method step S100 characterizes a provision of a first type of examination information and a second type of examination information for selection via an input means.

Method step S101 characterizes a reception of the selected type of examination information in a control unit.

Method step S102 characterizes a selection of an X-ray emitter configuration from a plurality of X-ray emitter configurations as a function of the received type of examination information via the control unit.

Method step S103 characterizes a determination of a control signal as a function of the selected X-ray emitter configuration.

Method step S104 characterizes an automatic adjustment of a mechanical adjustment unit (mechanical adjuster) of the X-ray emitter in accordance with the determined control signal for changing the orientation of the X-ray emitter with respect to the recording area.

Method step S105 characterizes a generation of X-ray radiation with the X-ray radiation characteristic via the set X-ray emitter for fluoroscopy of the examination object in the recording area.

Figure 2:
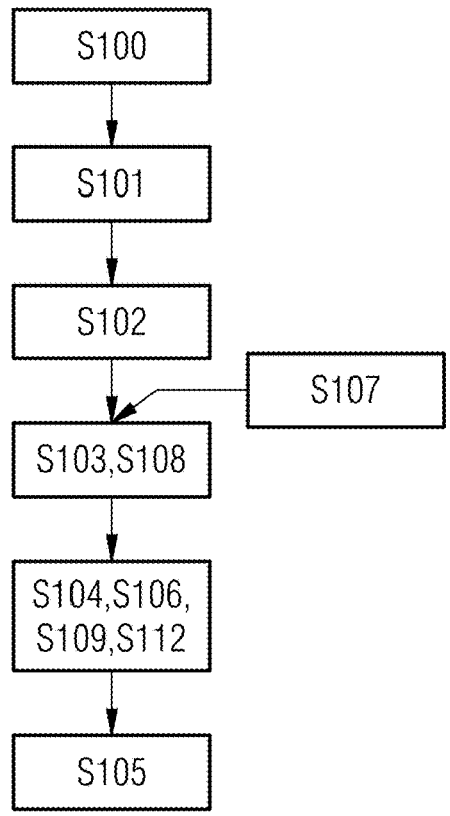
FIG. 2 shows a first exemplary embodiment of the method according to the invention.

FIG. 2 shows a first exemplary embodiment of the method according to the invention in a flow chart.

The first type of examination information describes an interventional radiography. The second type of examination information describes an angiography. The X-ray radiation characteristic of the first X-ray emitter configuration differs from the X-ray radiation characteristic of the second X-ray emitter configuration in a maximum X-ray radiation dose and/or in a maximum X-ray radiation cross-section.

The control signal has a tilt angle signal as a function of the selected X-ray emitter configuration. The mechanical adjustment unit has a tilting facility for tilting the X-ray emitter in relation to the recording area. The tilt angle signal describes a tilt, in particular by an angle between $-10°$ and $10°$.

The control signal also has a movement length signal. The mechanical adjustment unit has a movement facility for moving the X-ray emitter along a linear axis. The linear axis runs parallel to the recording area. The movement length signal describes a movement in particular by a length between $-10$ mm and $10$ mm.

Method step S107 characterizes that position information of an anti-scatter grid is retrieved.

Method step S108 characterizes that the movement length signal is determined as a function of the position information.

Method step S112 characterizes that the automatic adjustment comprises the movement of the X-ray emitter according to the movement length signal.

Method step S106 characterizes that the automatic adjustment comprises the tilting of the X-ray emitter according to the tilt angle signal.

Method step S109 characterizes that the automatic adjustment comprises changing the relative position between the X-ray emitter and the anti-scatter grid.

In particular, method steps S106, S109, S112 can be performed at least partially simultaneously, preferably synchronized, or consecutively.

Figure 3:
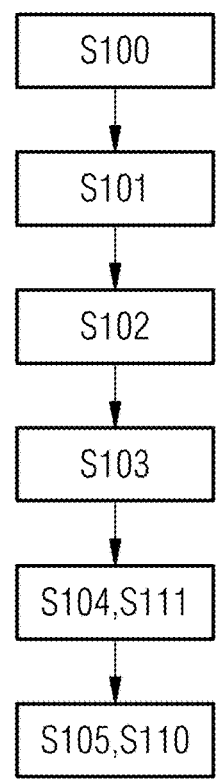
FIG. 3 shows a second exemplary embodiment of the method according to the invention.

FIG. 3 shows a second exemplary embodiment of the method according to the invention in a flow chart.

The control signal has an emitter selection signal as a function of the selected X-ray emitter configuration. A cathode of the X-ray emitter has a first electron emitter and a second electron emitter. The first electron emitter is assigned to the electron emitter configuration for electron emission and the second electron emitter is assigned to the second X-ray emitter configuration for electron emission.

Method step S110 characterizes that the generation of the X-ray radiation comprises an electron emission via the first electron emitter or the second electron emitter according to the emitter selection signal.

The control signal also has a collimator cross-section signal as a function of the selected X-ray emitter configuration. The X-ray emitter has a collimator.

Method step S111 characterizes that the automatic adjustment comprises an adjustment of the collimator cross-section of the collimator according to the collimator cross-section signal.

Figure 4:
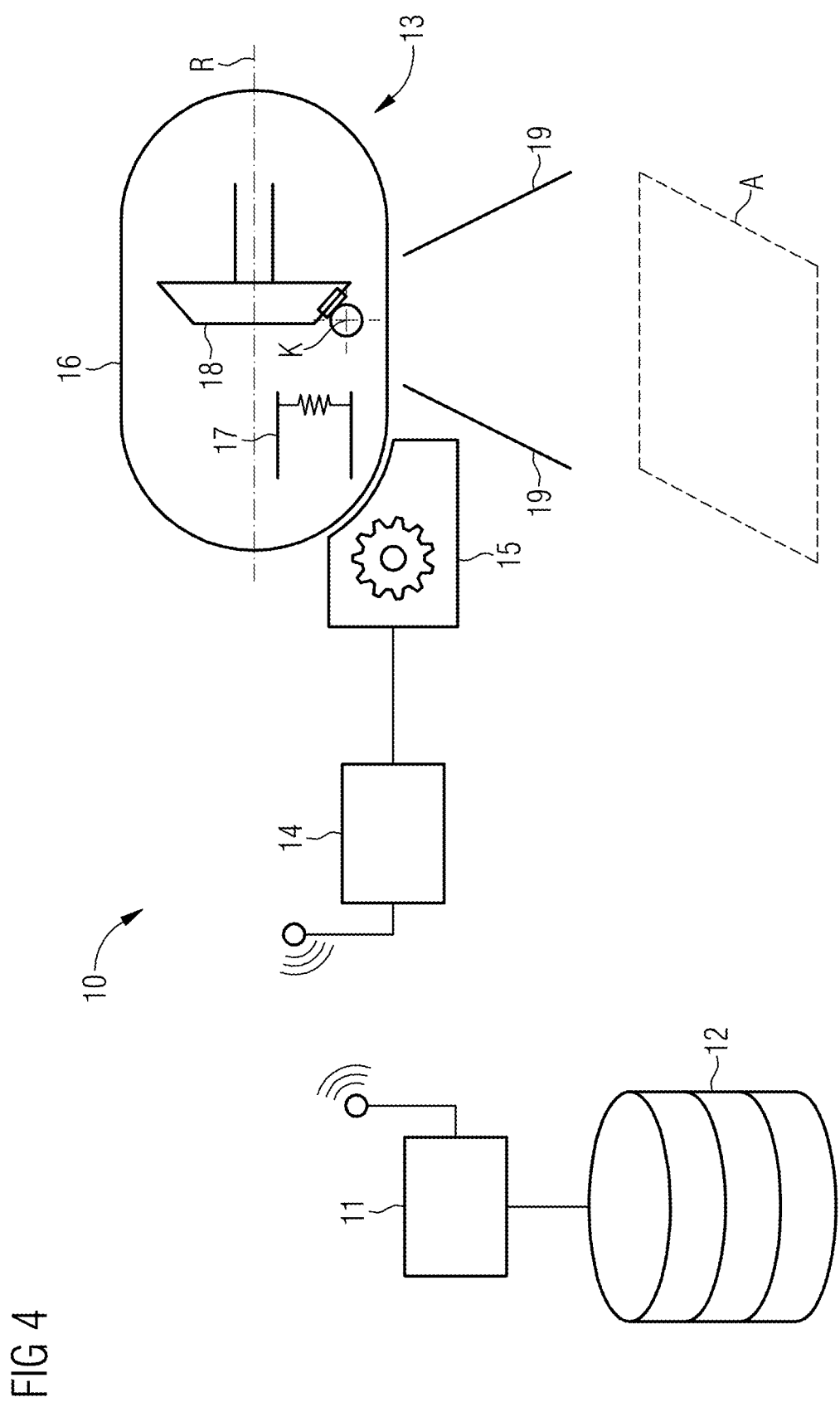
FIG. 4 shows an X-ray emitter assembly.

FIG. 4 shows an X-ray emitter assembly 10 in a block diagram.

The X-ray emitter assembly 10 is set up to generate X-ray radiation having an X-ray characteristic. The X-ray emitter assembly 10 has a control unit 11 (controller), a storage unit 12 and an X-ray emitter 13. The X-ray emitter 13 has an interface 14, a mechanical adjustment unit 15, an evacuated X-ray tube 16, a cathode 17 and an anode 18. In the evacuated X-ray tube 16, the anode 18 is arranged in a rotatable manner about an anode axis R. The cathode 17 is arranged above the anode 18 decentrally with respect to the anode axis R. The control unit 11 can be connected to the interface 14 to transmit the control signal.

Furthermore, the X-ray emitter 13 has a collimator 19. The mechanical adjustment unit 15 has a tilting facility for tilting the evacuated X-ray tube 16 relative to the recording area A about a tilt axis K. The tilt axis K is perpendicular to the anode axis R and intersects the anode 18 substantially in its focal spot. Substantially means that the focal spot is arranged preferably less than 10 cm, particularly advantageously 2 cm, at a distance away from the tilt axis K.

Figure 5:
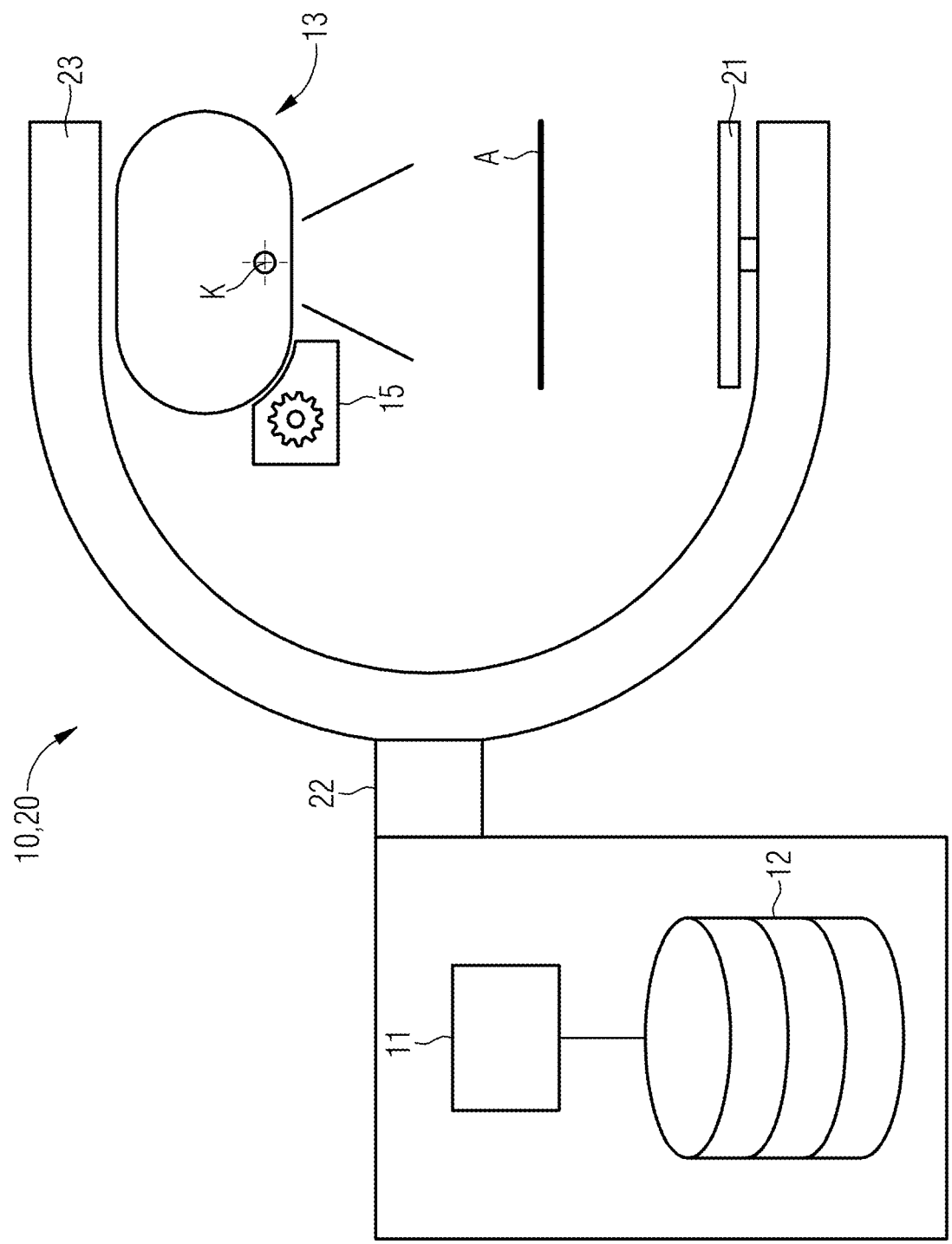
FIG. 5 shows a C-arm X-ray system.

FIG. 5 shows a C-arm X-ray system 20 in a block diagram. The C-arm X-ray system 20 has an X-ray emitter assembly 10, an X-ray detector 21, a holding apparatus 22 and a C-arm 23.

The C-arm 23 surrounds the recording area A. The X-ray emitter 13 is arranged at a first end of the C-arm 23. The X-ray detector 21 is arranged at the second end of the C-arm 23 opposite the X-ray emitter 13. The C-arm 23 is arranged on the holding apparatus 22 and can be pivoted around the recording area A.

The tilt axis K of the mechanical adjustment unit 15 is perpendicular to the C-arm plane. The C-arm plane corresponds to the image plane in FIG. 5. Alternatively or additionally, the linear axis of the mechanical adjustment unit 15 can run in the C-arm plane or transversely offset parallel to the C-arm plane.

The recording area A is shown as a plane in FIG. 5. In particular, the recording area A comprises at least part of a volume between the X-ray emitter 13 and the X-ray detector 21.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although the invention has been illustrated and described in detail by way of the preferred exemplary embodiments, the invention is nevertheless not restricted by the examples given and other variations can be derived therefrom by a person skilled in the art without departing from the protective scope of the invention.

The invention claimed is:

1. A method for generating X-ray radiation having an X-ray characteristic via an X-ray emitter for fluoroscopy of an examination object in a recording area, the method comprising:
   providing a first type of examination information and a second type of examination information for selection;
   receiving a selected type of examination information in a controller;
   selecting an X-ray emitter configuration from a plurality of X-ray emitter configurations as a function of the selected type of examination information received via the controller;
   obtaining position information of an anti-scatter grid;
   determining a control signal as a function of the selected X-ray emitter configuration, the control signal including a movement length signal determined as a function of the position information;
   automatically adjusting a mechanical adjuster of the X-ray emitter according to the determined control signal to change an orientation of the X-ray emitter in relation to the recording area; and
   generating X-ray radiation with the X-ray characteristic via the X-ray emitter set for fluoroscopy of the examination object in the recording area,
   wherein the automatically adjusting includes moving the X-ray emitter according to the movement length signal and changing a relative position between the X-ray emitter and the anti-scatter grid.

2. The method of claim 1, wherein the first type of examination information describes an interventional radiography and the second type of examination information describes an angiography.

3. The method of claim 2, wherein an X-ray radiation characteristic of a first X-ray emitter configuration differs from an X-ray radiation characteristic of a second X-ray emitter configuration according to at least one of a maximum X-ray radiation dose or a maximum X-ray radiation cross-section.

4. The method of claim 3, wherein
   the control signal has a tilt angle signal, the tilt angle signal being a function of the selected X-ray emitter configuration,
   the mechanical adjuster comprises a tilting facility configured to tilt the X-ray emitter with respect to the recording area, and
   the automatically adjusting comprises tilting the X-ray emitter according to the tilt angle signal.

5. The method of claim 2, wherein
   the control signal has an emitter selection signal, the emitter selection signal is a function of the selected X-ray emitter configuration, a cathode of the X-ray emitter comprises a first electron emitter and a second electron emitter, the first electron emitter is associated with a first X-ray emitter configuration for electron emission and the second electron emitter is associated with a second X-ray emitter configuration for electron emission, and the generating the X-ray radiation comprises electron emission via the first electron emitter or the second electron emitter in accordance with the emitter selection signal.

6. The method of claim 2, wherein the control signal has a focal spot length signal, the focal spot length signal is a function of the selected X-ray emitter configuration, the X-ray emitter comprises a deflector configured to adjust a length of an electron beam cross-section, and the generating the X-ray radiation comprises deflecting emitted electrons via the deflector according to the focal spot length signal.

7. The method of claim 1, wherein an X-ray radiation characteristic of a first X-ray emitter configuration differs from an X-ray radiation characteristic of a second X-ray emitter configuration according to at least one of a maximum X-ray radiation dose or a maximum X-ray radiation cross-section.

8. The method of claim 1, wherein the control signal has a tilt angle signal, the tilt angle signal being a function of the selected X-ray emitter configuration, the mechanical adjuster comprises a tilting facility configured to tilt the X-ray emitter with respect to the recording area, and the automatically adjusting comprises tilting the X-ray emitter according to the tilt angle signal.

9. The method of claim 8, wherein the tilt angle signal describes the tilting by an angle of between −10° and 10°.

10. The method of claim 1, wherein the mechanical adjuster has a movement facility configured to move the X-ray emitter along a linear axis, and the linear axis extends parallel to the recording area.

11. The method of claim 1, wherein the movement length signal describes a movement by a length of between −10 mm and 10 mm.

12. The method of claim 1, wherein the control signal has an emitter selection signal, the emitter selection signal is a function of the selected X-ray emitter configuration, a cathode of the X-ray emitter comprises a first electron emitter and a second electron emitter, the first electron emitter is associated with a first X-ray emitter configuration for electron emission and the second electron emitter is associated with a second X-ray emitter configuration for electron emission, and the generating the X-ray radiation comprises electron emission via the first electron emitter or the second electron emitter in accordance with the emitter selection signal.

13. The method of claim 1, wherein the control signal has a focal spot length signal, the focal spot length signal is a function of the selected X-ray emitter configuration, the X-ray emitter comprises a deflector configured to adjust a length of an electron beam cross-section, and the generating the X-ray radiation comprises deflecting emitted electrons via the deflector according to the focal spot length signal.

14. The method of claim 1, wherein the control signal has a collimator cross-section signal, the collimator cross-section signal is a function of the selected X-ray emitter configuration, the X-ray emitter has a collimator, and the automatically adjusting comprises adjusting a collimator cross-section of the collimator in accordance with the collimator cross-section signal.

15. An X-ray emitter assembly for generating the X-ray radiation having the X-ray characteristic as claimed in claim 1, the X-ray emitter assembly comprising:

the controller;

a memory; and the X-ray emitter, wherein the X-ray emitter has an interface, the mechanical adjuster, an evacuated X-ray tube, a cathode, an anode and a collimator, in the evacuated X-ray tube, the anode is arranged rotatably about an anode axis and the cathode is arranged above the anode decentrally to the anode axis, and the controller is connectable to the interface for transmitting the control signal.

16. The X-ray emitter assembly of claim 15, wherein the mechanical adjuster has a tilting facility configured to tilt the evacuated X-ray tube relative to the recording area about a tilt axis, and the tilt axis is perpendicular to the anode axis and intersects the anode substantially in a focal spot.

17. A C-arm X-ray system, comprising:

the X-ray emitter assembly of claim 16;

an X-ray detector;

a holding apparatus; and a C-arm, wherein the C-arm surrounds the recording area, the X-ray emitter is arranged at a first end of the C-arm, the X-ray detector is arranged at a second end of the C-arm opposite the X-ray emitter, the C-arm is arranged on the holding apparatus and pivotably about the recording area, and at least one of the tilt axis of the mechanical adjuster is perpendicular to a C-arm plane or a linear axis of the mechanical adjuster runs parallel to the C-arm plane.

18. A non-transitory computer readable medium having instructions that, when executed by a controller, cause the controller to perform the method of claim 1.

* * * * *